Sept. 2, 1958 — R. A. VISSING — 2,849,795
LENS COVERS
Filed Nov. 15, 1955 — 3 Sheets-Sheet 1
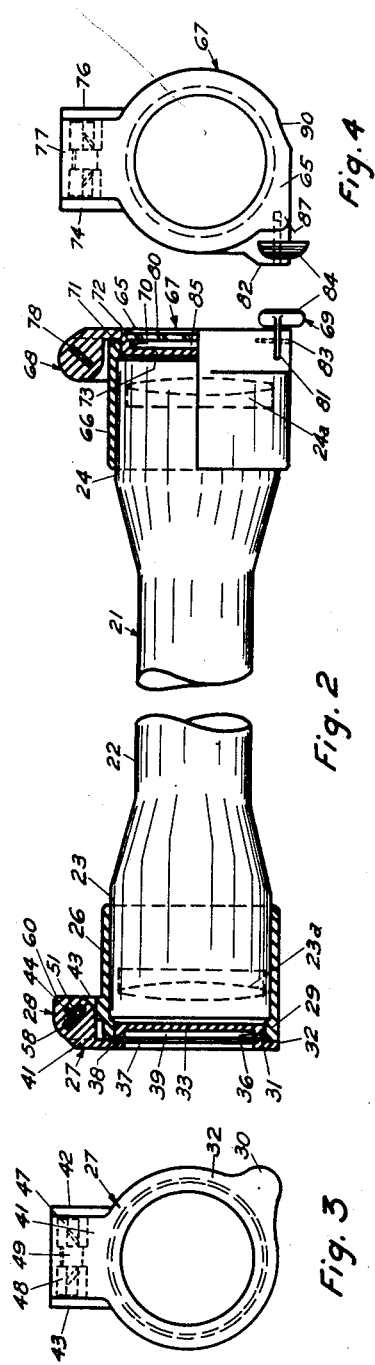
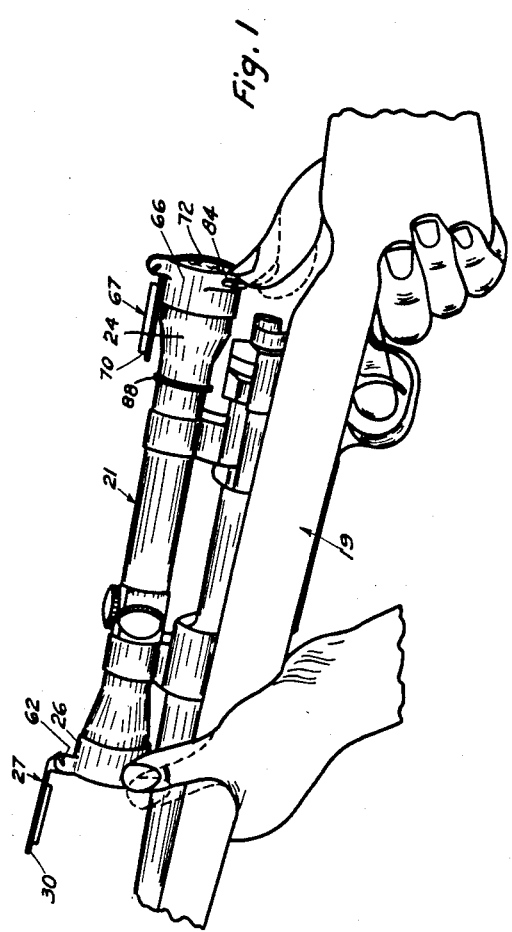
Royal A. Vissing
INVENTOR.
BY Llewellyn A. Young Sept. 2, 1958     R. A. VISSING     2,849,795
LENS COVERS
Filed Nov. 15, 1955     3 Sheets-Sheet 2
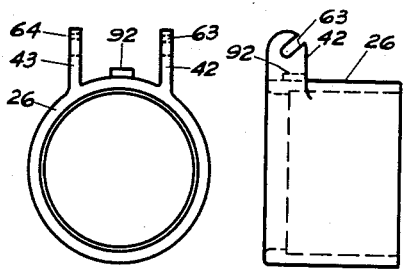
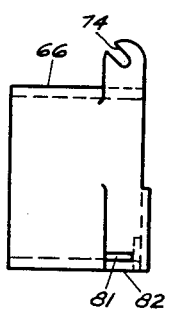
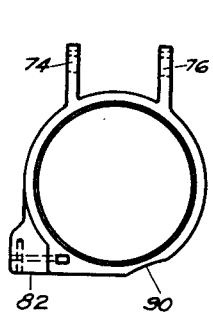
Fig. 6    Fig. 5    Fig. 7    Fig. 8
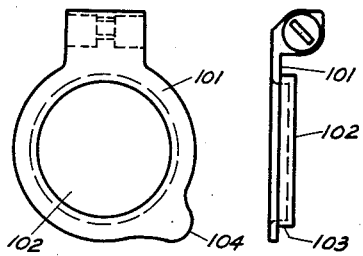
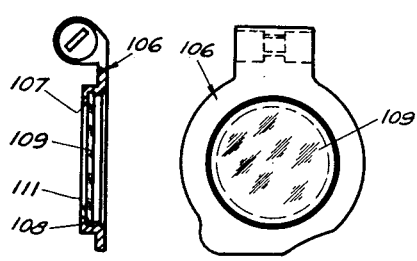
Fig. 10    Fig. 9      Fig. 11    Fig. 12
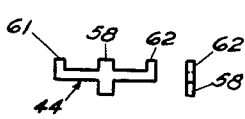
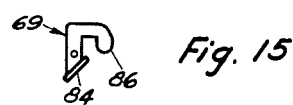
Fig. 13    Fig. 14      Fig. 15
Fig. 16
Royal A. Vissing
     INVENTOR.
BY Llewellyn A. Young Sept. 2, 1958      R. A. VISSING      2,849,795
LENS COVERS Filed Nov. 15, 1955      3 Sheets-Sheet 3

Royal A. Vissing
INVENTOR.

BY

United States Patent Office 2,849,795
Patented Sept. 2, 1958

2,849,795

LENS COVERS

Royal A. Vissing, Reno, Nev.

Application November 15, 1955, Serial No. 546,844

15 Claims. (Cl. 33—50)

This invention relates to covers for optical systems and more particularly to lens covers for rifle telescopes.

An object of this invention is to provide a practically unbreakable, highly shock-resistant lens cover for a telescopic device.

Another object of the invention is the provision of a lens cover the operation of which is unaffected by extreme ranges of temperature.

Another object of the invention is to provide a lens cover for telescope rifle sights which is highly water repellant thereby practically eliminating the possibility of a malfunction due to the engaging parts being frozen together at low temperatures.

Another object of the invention is to provide a lens cover of low thermal conductivity and having a dual dead air space to minimize fogging of the telescope lens resulting from a substantial and fairly rapid change of temperature.

Another object of the invention is to provide an optical lens cover which has multiplicity of sealing surfaces thereby positively preventing snow, moisture, dust or any foreign matter from contacting the lens.

Another object of the invention is to provide an extremely light weight lens cover for a telescope sight.

Another object of the invention is the provision of a lens cover for telescope sights that may be used with or without opening the cover.

A still further object of the invention is to provide a lens cover for telescope sights which is easily installed while in the field and without requiring any tools or any particular skill.

A still further object is to provide an improved telescope lens cover which stays permanently attached to the telescope until the operator removes it.

A still further object is to provide a lens cover for telescope sights which will not mar or mutilate a telescope.

A still further object is the provision of a lens cover for telescope sights that is silent in operation, thereby preventing the "spooking" of game when the cover is opened.

A still further object is the provision of lens covers for telescope riflle sights that have fast, simple and novel means for opening the covers and which will not be accidentally actuated when removing the telescopic sight from a scabbard.

A still further object is to provide a lens cover for telescope riflle sights that has no over-hanging projections to injure the rifleman's eye when shooting a rifle of heavy recoil.

A still further object is to provide a lens cover for telescope rifle sights that may be instantly opened without using any metallic springs, screws, hinges, or any parts likely to malfunction due to rust.

A still further object is to provide a lens cover for telescope sights which incorporates a novel fully enclosed, frictionless elastic hinge assembly.

A still further object is to provide a lens cover for telescope rifle sights that is instantly operated by a positive pushing force of each thumb when the rifle is in a normal shooting position.

A still further object is to provide a lens cover for telescope rifle sights which will be friction-tight, regardless of the well known variation in individual telescope tube diameters.

A still further object is to provide a lens cover for telescope rifle sights which is extremely rugged, simple and one which can be manufactured and sold at a price within the reach of every rifleman.

Another object of the invention is to provide a lens cover for telescopes which will automatically position the sealing surfaces for proper contact by merely pushing the lens cover into place.

A still further object of the invention is the provision of a lens cover for each end of a telescopic rifle sight which may at the discretion of the user be operated individually or simultaneously.

A still further object of the invention is the provision of a lens cover for each end of a telescopic rifle sight which may be simultaneously operated without requiring any movable member connecting each of the lens covers.

Another object of the invention is to provide lens covers for a telescopic rifle sight which readily allows focal adjustments to be made at either end of the telescope and to make such adjustments without requiring any tools.

Other objects and advantages of the invention will become more apparent upon reference to the accompanying drawings, in which:

Figure 1 shows a rifle with a telescope mounted thereon having lens covers embodying the present invention.

Figure 2 is a fragmentary side view of the telescope showing details of construction of the end covers.

Figure 3 is an end view of Figure 2.

Figure 4 is the opposite end view of Figure 2.

Figure 5 is a side view of the cover mounting for the end of the scope with the objective lens.

Figure 6 is an end view of the cover mounting for the end of the scope with the objective lens.

Figure 7 is a side view of the cover mounting for the end of the scope with the ocular lens.

Figure 8 is an end view of the cover mounting for the end of the scope with the ocular lens.

Figure 9 is a side view of a modified form of lens cover.

Figure 10 is an end view of the lens cover shown in Figure 9.

Figure 11 is a side view of another modified form of a lens cover.

Figure 12 is an end view of the modification shown in Figure 11.

Figure 13 and Figure 14 are a side view and an end view, respectively, showing details of the construction of the hinge pin or key.

Figure 15 and Figure 16 are the top view and an end view, respectively, of the lever for actuating the lens cover mounted on the ocular end of the telescope.

Figure 17:
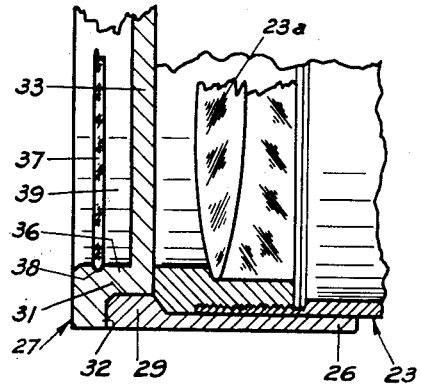
Figure 17 is an enlarged fragmentary view of the lens cover and the mounting for the objective lens end of the telescope, showing details of construction.

Referring now to the drawings, the invention is shown embodied in a cover device for the lens of a telescope 21. While the telescope shown herein for purposes of illustration is of the type used for sighting a gun, it is to be understood that the cover device may be used on any tubular instrument utilizing a lens system wherein it is desired to cover the lens. As best seen in Figures 1 and 2, the telescope is mounted on a rifle 19 and is of conventional construction having an elongated central portion 22, an enlarged tubular end 23 supporting an objective lens system 23a and an enlarged tubular end 24 supporting an ocular lens system 24a. Herein the telescope is mounted on top of the rifle so that the end of the telescope supporting the objective lens overlies the forearm of the rifle and the end of the telescope supporting the ocular lens overlies the pistol grip portion of the stock of the rifle.

Cover for objective end

In general the cover device for the end 23 is comprised of a collar 26, a lid or cover 27 movable between a closed position, in which the lid frictionally engages the collar 26, shown in Figure 2, and an open position, as shown in Figure 1, wherein the lid is out of the line of sight through the telescope, hinge means 28 normally biased to urge the lid 27 to its open position and which allows limited transaxial displacement or movement of the lid 27 relative to the collar to permit proper alinement of the collar and the lid in moving the latter to its closed position, and a tab 30 by which a pushing force may be applied to the lid to initially disengage the lid from frictional engagement with the collar. The collar is designed to have an inside diameter that allows it to be readily slipped over the end 23 but when in position the collar is positively held in position with an element-tight seal between the collar and the end 23 by frictional engagement of the parts. I have found that by making the collar of a relatively thin cross section, a collar formed from polyethylene resinous material having a diameter slightly less than that of the end 23 may be readily slipped over the end 23 yet may be frictionally held in position. This material has sufficient flexibility so that it permits the collar to conform readily to the configuration of the periphery of the end 23. At its extreme outer end the collar 26 is formed with an annular shoulder 29 seating against the extreme end of the tubular end 23 as shown, and forming a central opening 31 having substantially smooth cylindrical walls and of less diameter than the end 23.

The lid 27 in this instance includes an annular rim 32, a disklike central portion 33 at one side of the plane of the rim and an annular portion 36 interconnecting the rim 32 and the disc portion 33 so that the lid has the appearance of a rim and a depressed central portion. The rim 32 is shaped to seat against the extreme end of the annular shoulder 29 defining the outer end of the collar 26. The annular portion 36 is shaped to be seated in the central opening 31 formed by the annular shoulder 29 and retained in position by frictional engagement of the parts. It is to be understood that the fit of the parts shall be such that the lid shall be held in its closed position against the normal bias of the hinge means which urges the lid to its open position. Preferably the lid has a relatively thin cross section, as shown, and is formed from polyethelene resinous material. A disc 37, as shown, may be received in an annular groove 38 formed on the inner part of the depressed portion of the lid 27 as shown. Preferably the disc 37 is spaced from the disc portion 33 to provide an insulating airspace 39 between the latter member and the disc 37.

Figure 18:
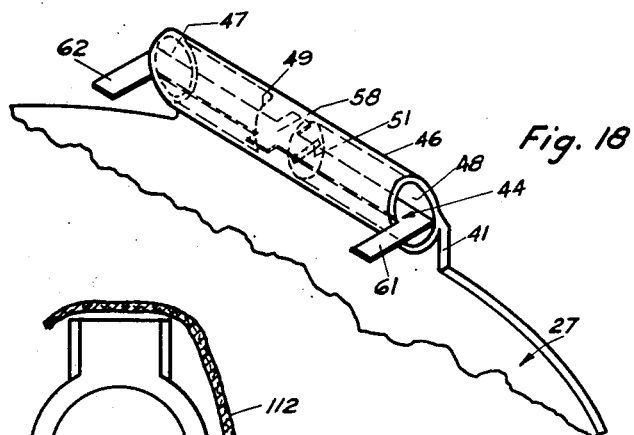
Figure 18 is an enlarged fragmentary perspective view showing details of construction of the hinge assembly for the lens cover.

The hinge means 28, as best shown in Figures 2, 3 and 18, is formed by upstanding rigid ears 42 and 43 spaced relatively far apart, integral with and projecting upward from the collar 26, a relatively wide tongue portion 41 integral with the lid 27 and projecting upward from the lid and received between the ears, as shown, and a key member 44 of deformable material such as rubber, holding the parts in assembled relation and defining a hinge pin. The tongue 41 terminates in an enlarged portion 46 on the same side of the rim 32 as the disc portion 33. Cylindrical recesses 47 and 48 are formed on opposite ends of the portion 46 and are arranged to be in alinement. Between the recesses 47 and 48 is a separation partition 49 having an elongated slot 51 effecting communication between the recesses 47 and 48. The slot is shaped to snugly receive an enlarged central portion 58 of the key member 44. The recesses 47 and 48 are of sufficiently large diameter to permit reception of the key member 44 while the parts are being assembled. The width of the enlarged portion 58 is substantially the same as the axial length of the partition 49. The enlarged outer ends 62 and 61 of the key member 44, which in this instance are in effect arms at right angles to the axis of the member 44 and in parallel relation to the portion 58, are spaced from the central portion 58 as sufficient distance to be received in elongated slots 63 and 64 formed on rigid ears 42 and 43 respectively. The slots 63 and 64 are disposed at an angle and open onto the periphery of the ears, as shown in Figures 1, 5 and 6. With this construction if the tongue 41 is formed integral with the lid 27 and the upstanding ears 42 and 43 are formed integral with the collar, and the key member 44 is formed of rubber or other material capable of being stressed, the latter may be pre-stressed upon initially assembling the parts so that when the ends 62 and 61 of the key are disposed in the slots 63 and 64 a torsional force normally urges the lid 27 to an open position. As can be seen, by proper arrangement of the parts this force may be made sufficiently great so that when the lid is initially moved to a position such that the annular portion 36 becomes practically disengaged from the side walls of the opening 31 at the end of the collar, the lid 27 automatically moves to its open position.

The tab 30 is located on the side of the lid 27 away from the hinge means 28, and, as shown, in this instance is on the lower lefthand side (when viewing the installation as by the rifleman as shown in Figure 1) of the collar 26. It is sufficiently large so that it projects beyond the collar 26 and may be readily engaged by the thumb of the user of the telescope.

As best shown in Figures 2, 5, and 6, the tongue portion 41 is formed with a projection 60 on the enlarged portion 46 that engages with a shoulder 92 formed on the top of the collar 26 between the ears 42 and 43. The engagement of the projection 60 with the shoulder 92 in effect limits movement of the lid 27 so that it remains in a horizontal position out of the line of sight as shown in Figure 1.

Cover for ocular end

The cover device for the ocular end of the telescope, in general, is comprised of a collar 66, a lid or cover 67, hinge means 68, and lever-actuated means for initially opening the cover or lid, arranged to be actuated by a transverse movement of an operator's thumb. The collar 66 has the same general construction as the collar 26 described herein before and is arranged to be mounted on the end 24 of the telescope 21. An arcuate groove 90 on the periphery of the collar and extending lengthwise thereof provides for clearance of the bolt on the rifle 19 as is shown in Figure 4. At its outer end the collar is formed with an annular shoulder 71 which seats against the extreme outer end of the end 24. The inner portion of the annular shoulder defines an opening 72 shaped to receive the lid 67. The latter also includes a rim portion 65 shaped to seat against the shoulder 71, an annular portion 70 shaped to be snugly received in the opening 72, and a disclike central portion 73 all similar to the construction herein before described. A disc 80 is also retained in spaced relation to the central portion 73 to define an air-space 85. The hinge means 68 includes relatively widely spaced ears 74 and 76 integral with and upstanding from the collar 66, a tongue 77 projecting outward from the lid 67 and disposed between the upstanding ears 74 and 76, and a key member 78 disposed between the tongue 77 and the ears 74 and 76 in the same manner as described for the hinge means 28.

The lid is initially moved from disengagement from the associated collar parts by a lever 69. The latter is disposed in a horizontal slot 81 formed in a projecting boss 82 on the lower lefthand side (see Figure 4) of the collar 66. The lever 69 is held in position by a pivotal pin 83 retained in the boss by a force fit or other suitable means. The outer end of the lever 69 is formed with a tab 84 shaped to be engaged by an operator's finger or thumb. The inner end 86 of the lever 69 is shaped to engage a tab 87 formed on the rim 65 of the lid 67 on the side of the cover away from the hinge means 68.

To focus the reticule for individual eyesight the enlarged end 24 is threaded to the elongated tube 22 and locked in correct focal position by an internally threaded clamp ring 88 in a conventional manner. Since it forms no part of the present invention and for simplicity of drawings, neither the conventional ocular or objective focal adjustments are shown.

Modifications

In Figures 9 and 10 there is shown a modified form of my invention. In this modification the cover device is of substantially the same construction as hereinbefore described including a rim 101, a depressed portion 102, and an annular portion 103 interconnecting the rim with the depressed portion 102. A tab 104 is also formed on the rim 101. In this construction the disc 37 and the insulating airspace have been omitted.

In Figures 11 and 12 another modification of the invention is shown. In this instance the cover device includes a lid 106 that is similar to the construction shown in Figure 2 except that an opening 107 is provided in a central portion 108 and a transparent glass 109, retained in an annular groove 111, covering the opening 107. With this construction it is apparent that sighting may be effected through the telescope without opening the lens covers. It is to be understood that with this construction there is some loss of light through the glass window, and a telescope utilizing this construction would be sighted with the cover closed only under emergency conditions.

Operation

The operation of the lens covers shown herein is apparent from the foregoing, but will be described briefly hereinafter, as follows: The lens covers described herein are normally sold separately from the scope and first must be mounted on the scope on which they are to be used. The lens covers for the objective and ocular lenses are mounted so that the collar 26 and the collar 66 respectively fit over the enlarged ends 23 and 24 of the telescope 21. These may be mounted by merely pushing them over the respective ends of the telescope until the collars are positioned so that the ends of the scope fit against the annular shoulders 29 and 71, as shown. When properly mounted the lids may be simultaneously opened with the thumb of each hand without removing the hands from their normal firing position, as shown in Figure 1.

Since the covers at the ocular and objective ends of the telescope are separate entities, structurally unconnected apart from the telescope itself, it is apparent that the two covers are independently rotatable and axially movable relative to one another, thus permitting the telescope to be focussed or otherwise adjusted to suit the vision of the rifleman, as is conventional in the art, without the lens covers interfering in any way with the making of such focussing or adjustment.

For purposes of illustrating the operation, assume that the lids are in a closed position, as shown in Figures 2 and 17. In this instance the rim 32 engages the extreme end of the collar 26 and the annular portion 36 frictionally engages the side walls of the opening 31. In a similar manner the rim 65 engages the outer end of the collar 66 and the annular portion 70 is snugly received in the opening 72. With the parts in these positions there is an airtight and moisture-tight seal between atmosphere and the respective lenses effected by engagement of the disc portions 33 and 73 with the ends of the telescope, engagement of the annular portions 36 and 70 with the sidewalls of the openings 31 and 72, and engagement of the rims 32 and 65 with the ends of the collars 26 and 66; thus, in effect there are three distinct seals. There are also two dead, or insulating, air spaces, i. e. between the disc portions 33 and 73 and their associated lens, and the air spaces 39 and 85 respectively.

Figure 19:
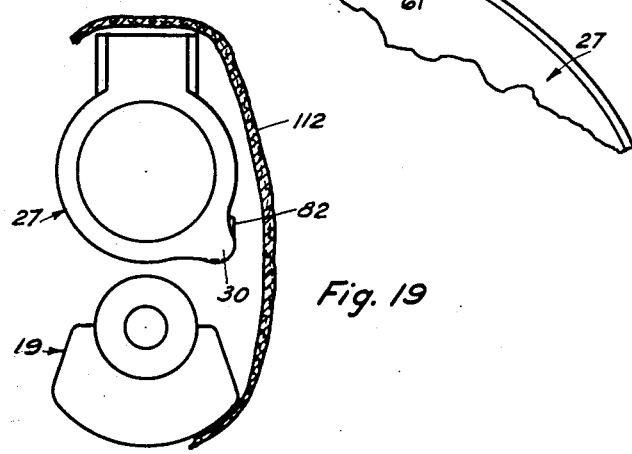
Figure 19 is a cross section view of a scabbard having a rifle and scope therein.

As can be seen in Figure 19, the tab 30 is arranged so that it is close to the rifle barrel and thus positioned to be out of contact with a scabbard 112 as the rifle 19 is being inserted or withdrawn therefrom. Also it will be noted that the force to open the lids is at a position approximately diametrically opposite the hinge axis, thereby assuring a maximum torque effect. The boss 82 and lever 69 are positioned so that the scabbard cannot contact the said boss and lever as the rifle is inserted and removed from the scabbard. It is noted that the lever 69 also acts on a point on the lid substantially diametrically opposite to the hinge axis.

With the collars 26 and 66 in their correctly mounted positions the tab 30 (Fig. 19) will be on the lefthand side of the gun barrel so as to be in a position to be readily pushed by the gun user's left thumb which is adjacent the forearm of the rifle when the latter is in a normal firing position, and the lever 69 will be on the lefthand side and in a position such that the gun user's right thumb, which is adjacent the pistol grip portion of the stock of the rifle when the latter is in its normal firing position, can quickly contact the enlargement 84 and apply a pushing force thereto. The hinge constructions 28 and 68 are such that the lids 27 and 67 when in their closed positions are subjected to a stress urging them to their open position; this force, however, is not sufficient to overcome the frictional engagement of the parts. When a pushing force, therefore, is applied to the tab 30 on the lid 27 and a pushing force is applied to lever 69 to apply a force on the tab 87, the frictional engagement of the lids 27 and 67 with the respective collars 26 and 66 is overcome and the lid 27 moves from the position shown in Figure 2 to the position shown in Figure 1 so that the projection 60 engages the shoulder 92 and limits further movement of the lid. As shown, the lid moves through a 90° angle. In a similar manner the bias of the hinge means 68 causes the lid 67 to move from the position shown in Figure 2 to the position shown in Figure 1 in which the lid moves through a 270° angle.

When it is desired to reclose the lids they must be manually moved to their closed position. As the lid 27 is moved to its closed position the annualar portion 36 is received in the opening 31. It is also observed that the ends 62 and 61 of the key are fixedly held by the ears 42 and 43 and that the central portion 68 of the key 44 is snugly received in the slot 51 of the partition 49. As a consequence, when the lid is moved from its open position to its closed position it is apparent that stresses are built up in the parts that tend to return the lid 27 to its open position. In other words, a torsional stress is set up that is used to automatically open the lid after it is initially disengaged from frictional engagement with the collar 26. The lid 67 closes in the same manner and the corresponding parts react in the same manner. Closing the lid 67 causes the lever to be returned to the position shown in Figure 2 when the tab 87 is forced against the end 86 of the lever 69.

The flexibility of the hinge assemblies makes it possible to obtain positive alinement of each lid or cover with the opening in the end of the collar. In effect each lid is floatably mounted to the collar to allow limited transaxial displacement of the lid relative to the collar.

The hinge construction is also meritorious in that it can be considered to be an almost frictionless hinge assembly. Also it is to be noted that the hinges do not extend beyond the end of the collar; as a consequence there is no danger of parts hitting the user's eye upon recoil of the gun. By pre-arranging the parts so that the key member 44 is stressed more than 90° and the key member 78 is stressed more than 270° the respective lids may be urged into engagement with their respective stops. Thus the lids are positively held in their open position.

Polyethelene resinous material has a waxy surface, and consequently water does not stay on the parts when the latter are formed of this material, so that even on cold rainy days or snowy days there is no possibility of the parts freezing in a closed position.

Thus it will be seen that I have provided an inexpensive lens cover for telescopic gun sights which will operate under extreme ranges of temperature and weather conditions, which will automatically compensate for slight differences in telescopic tube diameters, which is light weight, simple, highly shock resistant, rugged, reliable, fast in operation, and is a lens cover having a unique practically frictionless, fully enclosed, resilient hinge assembly. Additionally this lens cover may be quickly installed by anyone in the field without tools or any particular skill and it provides three distinct seals for positive protection against foreign matter contacting the lens. Also it should be noted that I have provided a lens cover which includes a dual dead air space to minimize the troublesome internal fogging of the lens, a modified cover which gives the rifleman a choice of using the device with open or closed lids, and a cover which will not be accidentally opened when the rifle is removed from its scabbard.

I claim:

1. In a lens cover for a tubular telescope having a line of sight therethrough, a first relatively thin, flexible, synthetic resinous collar having open ends and shaped to encircle an end of said telescope with a frictional fit; a lid having a rim portion shaped to engage the extreme end of said collar and a central portion shaped to fit snugly in one of said open ends; hinge means acting between said collar and said lid to permit said lid to be swung between a closed position in which the lid is seated against one end of said collar, and an open position in which said lid is out of the line of sight; torsional means for urging said lid into its open position and for holding it in such position; and a tab on said lid on the side away from said hinge means projecting outwardly from said collar to be manually engaged, and a collar mounted on the opposite end of said telescope from the first collar and similar thereto, said second collar having a lid, and hinge means corresponding to those associated with the first collar, both said collars being independently rotatable and axially movable relative to one another.

2. In a lens cover for a tubular telescope having a line of sight therethrough, a relatively thin, flexible, synthetic resinous collar having open ends and shaped to encircle an end of said telescope with a frictional fit, one of said ends of said collar being formed with an annular shoulder shaped to seat against an end of the telescope and to define an opening of smaller diameter than the end of said telescope on which said collar is mounted; a lid having a rim portion shaped to engage an extreme outer end of said collar, and a central portion shaped to fit snugly the interior of said last-mentioned opening; hinge means acting between said collar and said lid to permit said lid to be swung between a closed position and an open position in which said lid is out of the line of sight; torsional means normally urging said lid to its open position; lever means having an end engageable with said lid and an end free of said collar; and means for pivotally mounting said lever whereby pressure applied to said free end of the lever forces said lid to become disengaged from said collar, and a collar mounted on the opposite end of said telescope from the first collar and similar thereto, said second collar having a lid, and hinge means corresponding to those associated with the first collar, both said collars being independently rotatable and axially movable relative to one another.

3. In a lens cover for a tubular telescope having a line of sight therethrough, a relatively thin, flexible, synthetic resinous collar having open ends and shaped to encircle an end of said telescope with a frictional fit; a lid having a rim portion shaped to axially engage the extreme outer end of said collar and a central portion shaped to fit snugly into one of said open ends of said collar, said lid having a closed position in which said central portion is frictionally engaged in said opening and an open position in which said lid is out of the line of sight; biased hinge means acting between said collar and said lid urging said lid to its open position; a lever having an end engageable with said lid and an end free of said collar; and means for pivotally mounting said lever whereby to apply a pressure to said free end of the lever to force said lid from frictional engagement with said collar and thereby effect movement of said lid to its open position, and a collar mounted on the opposite end of said telescope from the first collar and similar thereto, said second collar having a lid, and hinge means corresponding to those associated with the first collar, both said collars being independently rotatable and axially movable relative to one another.

4. In a lens cover for a tubular telescope having a line of sight therethrough, a collar having two open ends and shaped to encircle an end of said telescope with a frictional fit; a pair of ears spaced apart and projecting outward from said collar, each of said ears having a slot; a lid having a rim portion shaped to engage an extreme outer end of said collar, and a central portion shaped to fit snugly in one of said open ends of said collar, said lid having an open position in which it is out of the line of sight and a closed position in which said rim engages the extreme outer end of the collar and the central portion fits snugly in one of said open ends of said collar; a projection on said lid adapted to be disposed between said ears and having recesses formed at opposite ends and a partition between said recesses having a narrow slot formed therein; an elastic member shaped to fit snugly in said narrow slot in said partition and to be retained in the slots in said ears, said slots being positioned relative to each other so that when the lid moves from its open to its closed position said elastic member is stressed to store energy to urge the lid to its open position; and a tab on said lid adapted to be manually engaged to initially disengage the lid from the collar.

5. The combination recited in claim 4 in which all parts but the elastic member are formed from flexible synthetic resinous material.

6. In a lens cover for an optical instrument having a lens-supporting tube, the combination of a first collar having two open ends, said collar being shaped to be mounted on one end of said tube and being movable both axially and rotatably relative to said tube to adjust the position of said collar on said tube; a lid adapted to abut against the extreme outer end of said collar and having a portion adapted to frictionally fit into one of said open ends, said lid having an open position in which it is out of the line of sight and a closed position in which said lid is frictionally engaged with the collar to effect a seal; a tab on said lid projecting beyond said collar adapted to be manually engaged; flexible hinge means between said collar and lid permitting self-alinement of said parts as said lid moves between its open and its closed positions, a second collar having two open ends, said second collar being shaped to be mounted on one end of said tube and being movable relative to said end of said tube; a second lid adapted to abut against the extreme outer end of said second collar and having a portion adapted to frictionally fit one of the open ends of said second collar, said second lid having an open position in which it is out of the line of sight and a closed position in which said second lid is frictionally engaged with the second collar to effect a seal; a second flexible hinge means between said second collar and second lid permitting self-alinement of said parts as said second lid moves between its open and its closed positions; and lever-actuated means mounted on said second collar and engageable with said second lid whereby to apply a pushing force to said second lid.

7. In a lens cover for a tubular telescope having a line of sight therethrough, a collar having open ends and shaped to encircle an end of said telescope with a frictional fit, said collar being manually adjustable both axially and rotatably relative to said telescopic device one of said open ends of said collar being of a smaller diameter than the major diameter of said telescopic device; a lid having a rim portion shaped to engage one axial face of said collar and a central portion shaped to fit snugly in said opening of smaller diameter, said lid having an open position in which it is out of the line of sight and a closed position in which said rim portion abuts the end of the collar and said central portion fits snugly in said opening of smaller diameter; relatively flexible wide hinge means acting between said collar and said lid to allow said lid to be swung between said closed position and said open position, said hinge means permitting relative radial displacement of the lid with respect to the collar whereby to effect self alinement of the parts, said hinge means being adapted to store energy when said lid is moved from its open to its closed position to urge said lid into its open position; and a tab on said lid located substantially diametrically opposite to said hinge means, projecting outward from said collar to be manually engaged to initially disengage said lid from frictional engagement with said collar.

8. In a lens cover for a tubular telescope having a line of sight therethrough, a collar having open ends and shaped to encircle an end of said telescope with a frictional fit, said collar being manually adjustable both axially and rotatably relative to said telescope one of said open ends being of a smaller diameter than the major diameter of said telescope; a lid having a rim portion shaped to engage one axial face of said collar and a central portion shaped to fit snugly in said opening of smaller diameter, said lid being movable between an open position in which said lid is out of the line of sight and a closed position in which said lid frictionally engages the collar; hinge means acting between said collar and said lid adapted to effect self alinement of the lid with the collar as the lid moves from its open to its closed position; and a tab on said lid on the side away from said hinge means projecting outward from said collar whereby a force may be applied to said lid to initially disengage the latter from frictional engagement with the collar.

9. The combination recited in claim 8 in which the collar and lid are formed of synthetic resinous material having a waxy surface and adapted to repel liquid.

10. The combination recited in claim 1 in which the central portion of said lid is transparent.

11. The combination recited in claim 1 in which means coacting with said rim portion of the lid and said central portion define an insulating air space adjacent said central portion.

12. The combination recited in claim 2 in which said collar is formed with a groove on its outer surface extending lengthwise of the collar to provide clearance for a bolt on a rifle.

13. For use with a rifle having a pistol grip, a forearm, and a rifle telescope, having an objective lens and an ocular lens, adapted to be mounted on the top of the rifle to have its objective lens overlying the forearm and its ocular lens overlying the pistol grip; the combination of a first collar adapted to be mounted on the objective lens end of the telescope, a first lid having a first rim portion shaped to engage one end of said first collar and a first central portion shaped to fit snugly in one end of said first collar, first torsional hinge means between the first lid and the first collar, a tab on said first lid on the side thereof away from the first hinge means and positioned to be engageable by the thumb of a rifle user placed on the forearm whereby a pushing force applied to said tab effects initial opening of said first lid, a second collar adapted to be mounted on the ocular lens end of the telescope, a second lid having a second rim portion shaped to engage one end of said second collar and a second central portion shaped to fit snugly in one end of said second collar, second torsional hinge means between the second collar and lever-actuated means operable by a thumb of a user grasping the pistol grip whereby a pushing movement applied to the lever means effects initial opening of said second lid, said collars being independently rotatable and axially movable relative to one another.

14. For use with a rifle having a pistol grip, a forearm, and a rifle telescope mounted on the top of the rifle to have one end overlie the forearm and its opposite end overlie the pistol grip the combination of a first collar adapted to be mounted on one end of the telescope, a first lid having a first rim portion shaped to engage one end of said first collar and a first central portion shaped to fit snugly in one end of said first collar, first biased hinge means between the first lid and the first collar, a tab on said first lid on the side thereof away from the first hinge means and positioned to be engageable by the thumb of a user placed on the forearm and operable to effect initial opening of said lid upon application of a force applied to said tab, a second collar adapted to be mounted on the other end of the telescope, a second lid having a second rim portion shaped to engage one end of said second collar and a second central portion shaped to fit snugly in one end of said second collar, second biased hinge means between the second lid and the second collar and lever-actuated operable by a thumb of a user grasping the pistol grip responsive to a pushing movement applied thereto to effect initial opening of said second lid, said collars being independently rotatable and axially movable relative to one another.

15. For use with a rifle having a telescopic rifle sight having a line of sight therethrough, comprising a tube having open ends, an objective lens mounted in one of said open ends of said tube, and an ocular lens mounted on the opposite end of the tube; in combination, a first lid adapted to cover said objective lens, hinge means acting between said tube and said first lid to permit said lid to be swung between a closed position in which the lid covers said objective lens and an open position in which the lid is out of the line of sight; torsional means normally urging said lid into its open position; first means holding said first lid in its closed position; first finger actuated means positioned at the objective lens end of said tube to release said first lid from its closed position; a collar adapted to be mounted on the end of said tube supporting said ocular lens; a second lid adapted to cover the ocular lens of said telescopic sight; hinge means acting between said collar and said second lid to permit said second lid to be swung between a closed position in which the lid covers the ocular lens of said telescopic sight and an open position in which said lid is out of the line of sight; second torsional means normally urging said second lid into its open position; second means holding said second lid in its closed position; second finger actuated means supported by said collar to release said second lid from its closed position; said first and second finger-actuated releasing means being positioned for simultaneous and independent actuation when the user's hands are in their normal firing position on the telescopic sighted rifle carrying said lens covers; said second hinged lid, collar and its supported finger-actuated lid-releasing means being mounted for axial movement and rotation as a unit around said line of sight independently of the objective lens lid to permit focusing of said ocular lens, and independently of said telescopic sight for repositioning of said finger actuated releasing means.

References Cited in the file of this patent

UNITED STATES PATENTS

| | | |
|---|---|---|
| 815,062 | Bennett | Mar. 13, 1906 |
| 1,925,999 | De Giers | Sept. 5, 1933 |
| 2,197,184 | Kemp | Apr. 16, 1940 |
| 2,291,821 | McNabb | Aug. 4, 1942 |
| 2,334,225 | Socke | Nov. 16, 1943 |
| 2,534,061 | Rogers | Dec. 12, 1950 |